Dec. 1, 1970      I. LYSYJ ET AL      3,544,277

DUAL HEAT ZONE PYROLYTIC FURNACE

Filed Sept. 16, 1968

INVENTORS
IHOR LYSYJ
KURT H. NELSON
BY LAWRENCE H. GROEPER

Thomas S. MacDonald

ATTORNEY

United States Patent Office 3,544,277
Patented Dec. 1, 1970

3,544,277
DUAL HEAT ZONE PYROLYTIC FURNACE
Ihor Lysyj, Canoga Park, Lawrence H. Groeper, Woodland Hills, and Kurt H. Nelson, Thousand Oaks, Calif., assignors to North American Rockwell Corporation
Filed Sept. 16, 1968, Ser. No. 759,969
Int. Cl. B01j 9/04
U.S. Cl. 23—253    8 Claims

ABSTRACT OF THE DISCLOSURE

A pyrolytic furnace of concentric design for a sewage water or other organic-containing sample analyzer wherein the pyrolysis chamber, heating element and flow stabilization column or the tube are concentrically contained in one unit having variable heat zones for the chamber and the column.

SUMMARY OF INVENTION

This invention is directed to a pyrolytic furnace unit, particularly for a sewage water analyzer or other organic-containing sample, comprising a pyrolysis chamber, a single heating element, flow stablization column and a rotatable heat control shutter. The concentric design of the pyrolytic furnace unit permits individual inner zone temperature control for the pyrolysis chamber and outer zone heat control for the flow stabilization column. During sample analysis, the single heating element, for example, can maintain the pyrolysis chamber at temperature of 600° C. to 800° C. while the flow stabilization column is uniformly heated to temperatures of 120° C. to 160° C.

BACKGROUND OF THE INVENTION

Pyrolytic furnaces are used to pyrolyze organic waste material in analysis of wastewater for various purposes including measurement of biological oxygen demand (BOD). This measurement supplies information on the organic load of wastewaters, but no comprehensive capability has been developed for rapidly acquiring this information for immediate use. The classical BOD procedure is a delicate and sensitive test requiring both skill and experience for its correct performance. In addition, it has the major disadvantage of an elapsed time of six days between sampling and availability of results. Information acquired with this test is obtained long after the wastewater has been processed and the effluent has been discharged to the receiving waters. As a result, the data are of limited use to the personnel who must operate the treatment plant on the basis of other parameters and empirical rules.

A pyrographic technique of measuring BOD is seen in copending patent application, Ser. No. 672,190, filed Oct. 2, 1967. Generally furnaces used in pyrographic analysis comprise a metallic pyrolysis chamber, sometimes empty or packed with crystals, turnings or the like. Heating of the pyrolysis chamber is accomplished by electric coils, gas flame or the like. Separate from the pyrolysis chamber is generally a chromatographic column with an additional heating means as described above. In some cases a trap emersed in a Dry Ice-acetone bath is used between the pyrolysis chamber and the chromatographic column to retain hydrocarbon products, which are then subsequently emersed in a hot bath to release the hydrocarbons to proceed to the chromatographic column. A major disadvantage of the prior art furnace is that precise temperature control and heat transfer is difficult to achieve. Another disadvantage is that the prior art systems were cumbersome due to each part being independent from the other, requiring separate heating elements and traps.

Therefore, it is an object of this invention to provide an improved, compact pyrolytic furnace for incorporation into an organic analyzer system.

DETAILED DESCRIPTION OF THE INVENTION

Figure 1:
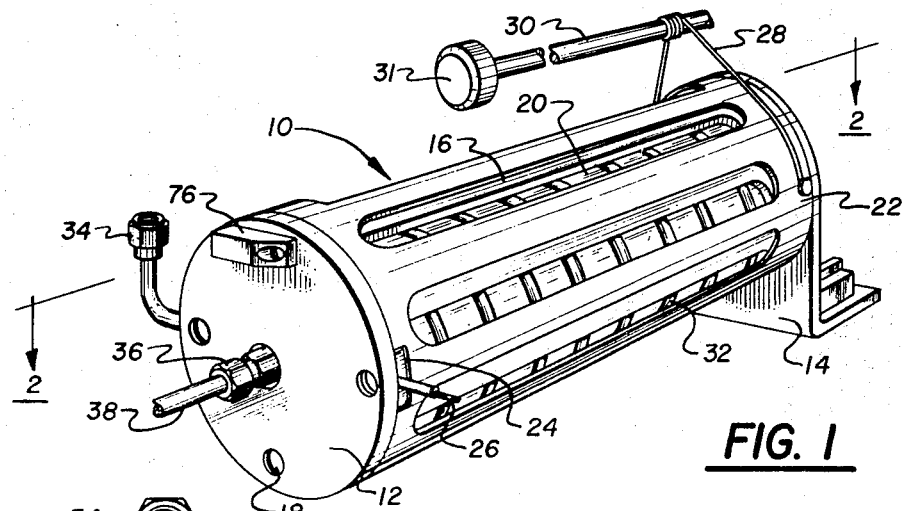
FIG. 1 is a perspective view of a pyrolytic furnace of the preferred embodiment of this invention.

The inventive concept disclosed herein provides a pyrolytic furnace unit which permits a pyrolysis chamber to be heated to high pyrolytic thermal conditions while maintaining stabilized flow of the pyrolyzed sample at a uniform operating temperature. The flow stabilizer (flow stabilization column or tube) meters the flow of the vaporized sample to prevent extinguishing of a detector flame after sample injection. Thus, referred to FIG. 1, pyrolytic furnace 10 comprises two end plates 12 and 14, the former typically of asbestos or transite material, the latter of aluminum, with a cylindrical furnace housing 16 stationarily mounted therebetween by screws 18. Metal housing 16 typically aluminum, is provided with plurality of elongated, longitudinal apertures or windows 20 in a spaced relationship. Concentrically positioned about the periphery of housing 16 is a rotatable, cylindrical aluminum shutter member 22 provided with windows of corresponding size, shape and number as furnace housing 16. A peripheral slot 24 is provided to enable rotation of shutter member 22 around the terminal portions of an inner heating element 26 during shutter operation. Rotation of shutter member 22 for controlling the temperature immediately interior thereof is accomplished by securing a cable 28 or like means to one side of the outside surface of shutter member 22, coiling the cable about an adjacent rotatably mounted, journalled shaft 30 and securing the opposite end of wire 28 to the other side of shutter member 22. Accordingly, rotation of a knob 31 attached to shaft 30 which knob is situated on the controls face outside of the overall instrument casing (not shown) above the sample injection valve results in movement of shutter member 22. Concentrically positioned within the inside diameter of housing 16 is a helical shaped, tubular flow stabilization column or tube 32, one end being connected to a hydrogen flame ionization detector (FIG. 3) or other detector by coupling 34, the other end 33 (FIG. 2) being connected to the exit end of the pyrolysis chamber. Extending axially through end plate 12 is coupling 36 which joins a sample injector supply line 38 with an inner pyrolysis chamber.

Figure 2:
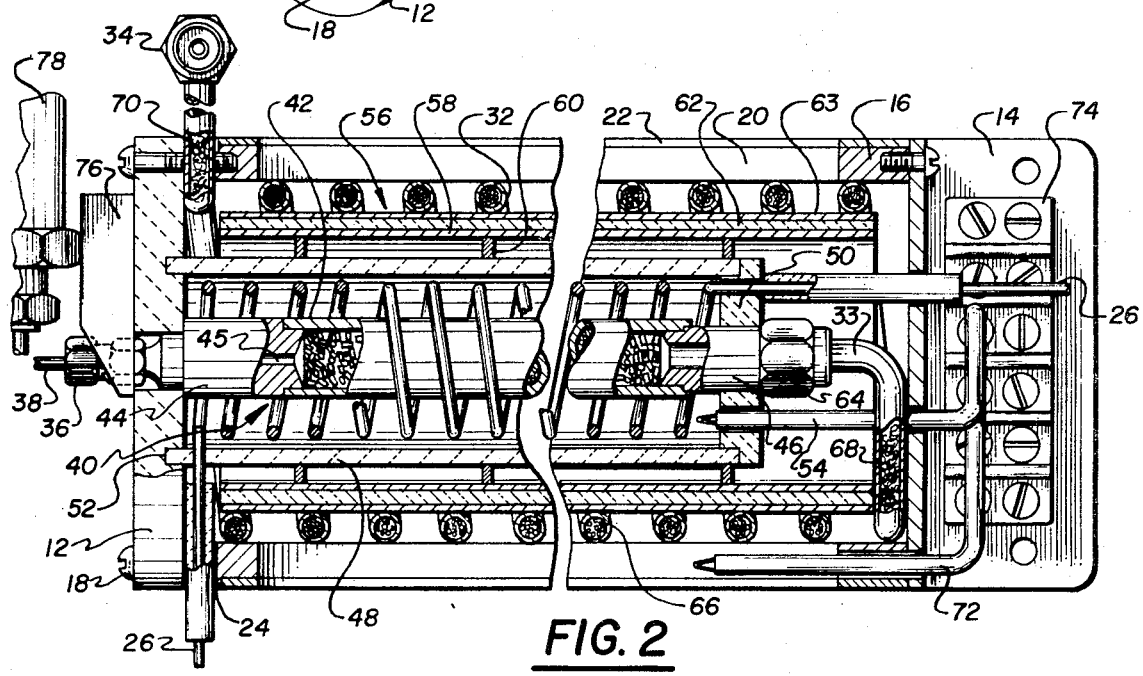
FIG. 2 is a partially fragmented, cross-sectional view taken along lines 2—2 of FIG. 1.

Turning now to FIG. 2, pyrolysis chamber 40 comprises a cylinder or tube 42 made of oxidation-resistant material preferably having a uniform thermal cross-section. Metals or alloys such as Monel or Inconel but preferably nickel may be utilized as the tube material. Tube 42 is welded to adaptors 44 and 46. Adaptor 44 is provided with a small diameter aperture 45 to increase the velocity of the sample which is injected into pyrolysis chamber 40 and includes means to accommodate fittings or couplings to enable connection to a means to conduct an organic-containing sample into the chamber, such means including an injector supply line 38 at the entrance end of chamber 40. Adaptor 46 is attached to flow stabilization column or tube 32 at the exit end of chamber 40. Preferably line 38 will be connected "in line" in the smallest possible lineal distance between the tube 42 and the sample valve 80. Located in the inside portion of pyrolysis chamber 40 can be a packing such as a multitude of loosely packed small diameter metallic rods typically made from nickel or like alloy and of a size of from $\frac{1}{32}$ to $\frac{1}{16}$ of an inch diameter by $\frac{1}{8}$ of an inch long. These rods act to fragment and disburse the homogenized organic waste injected into the pyrolysis chamber for more accurate subsequent detection.

Positioned axially about the pyrolysis chamber 40 is a helical heating coil of Nichrome wire or other material spaced from tube 42 and a spaced primary cylindrical ceramic insulation chamber 48 generally coextensive therewith and closure plate 50 of ceramic or any like refractory material. Initial heat input to the chamber 40 is controlled by a variable transformer (not shown) connected to the Nichrome heating element. The opposite end of chamber 48 is positioned in an annular groove 52 in the rear portion of end plate 12. Chamber 48 is also provided with apertures to permit access and connection of heating element 26, which provides the heat for an inner high heat zone around and in chamber 40, a thermocouple 54 to measure inner zone temperature and connection of the flow stabilization column 32 to pyrolysis chamber 40. Positioned axially about heating chamber 48 is an insulation barrier 56 comprising a stainless steel or like alloy heat shield 58 with inwardly directed annular upstanding rib members 60 which rest on chamber 48 and provide support for the insulation barrier. Positioned about the periphery of heat shield 58 and extending generally coextensive therewith are layers of insulation material 62, preferably sheet or tape asbestos, to provide increased insulation acting also to diminish heat flux from the inner heat zone and provide thermal stability. An outer heat reflector 63 of aluminum or like alloy is slip-fitted about the insulation material 62 to provide an additional heat barrier.

Concentrically positioned about insulation barrier 56 in the outer temperature zone is the flow stabilization column or tube 32 of helical shape which stabilizes and meters the flow of the pyrolyzed sample. One end of the flow stabilization tube is connected to the pyrolysis chamber 40 by coupling 64 and the other end is connected to a hydrogen flame ionization detector (not shown) by coupling 34. The internal portion of the flow stabilization column is normally filled with 50 to 60 mesh glass beads 66 in order to stabilize the flow of the carrier gas and the pyrolyzed organic waste material to the aforementioned detector. The mesh size of the glass beads may vary and are proportional to the length and cross-sectional size of the flow stabilization column. Also located in the first turns at each end of the column 32 are fibrous caps 68 and 70 of suitable material, an example being quartz wool or steel wool but preferably glass wool, to prevent the glass beads 66 from being expelled from the flow stabilization column during operation. Thermocouple 72 extends through end plate 14 and a portion of housing 16 between shutter member 22 and the flow stabilization column 32 so as to measure outer zone temperature resulting from heat being radiated from insulation barrier 56 which heats flow stabilization column 32 to a preferred operating temperature of 120° C. to 160° C. The insulation chamber 48 and heat barrier construction 56 provides for control and use of heat from the hot inner zone of the pyrolysis chamber to the outer zone containing the flow stabilization loop, the temperature in the outer zone being further controlled by the cylindrical shutter. Thermocouples 54 and 72 are connected to a terminal block 74 which is located on the flange portion of end plate 14, to facilitate all necessary electrical connections for instrumentation.

Secured to the outside surface of end-plate 12 by screw 18 is a substantially rectangular heat transfer block 76, preferably of copper or any like alloy which is a good heat conductor. Heat transfer block 76 is positioned so as to abut against a wrench flat or other area of a check valve 78 which allows passage of amounts of nitrogen carrier gas into sampling valve 80.

Control of heat transfer is accomplished by pivoting block 76 about the axis of its fastening means 18 to increase or decrease the contact area between block 76 and the aforementioned wrench flat. Heat transfer block 76 prevents condensation of water vapor within check valve 78 by keeping it in a prescribed temperature range. Condensation otherwise would impair the valve performance in that irregular flow would be the result if the optimum operating temperature was not correct. Heat transfer block 76 may alternatively be secured to check valve 78 and about the exterior of end-plate 12 wherein control of heat transfer can be accomplished by properly sized asbestos gaskets or washers. Heat transfer can be altered by changing configuration of block 76 so that contact area with end-plate 12 is increased or reduced.

Figure 3:
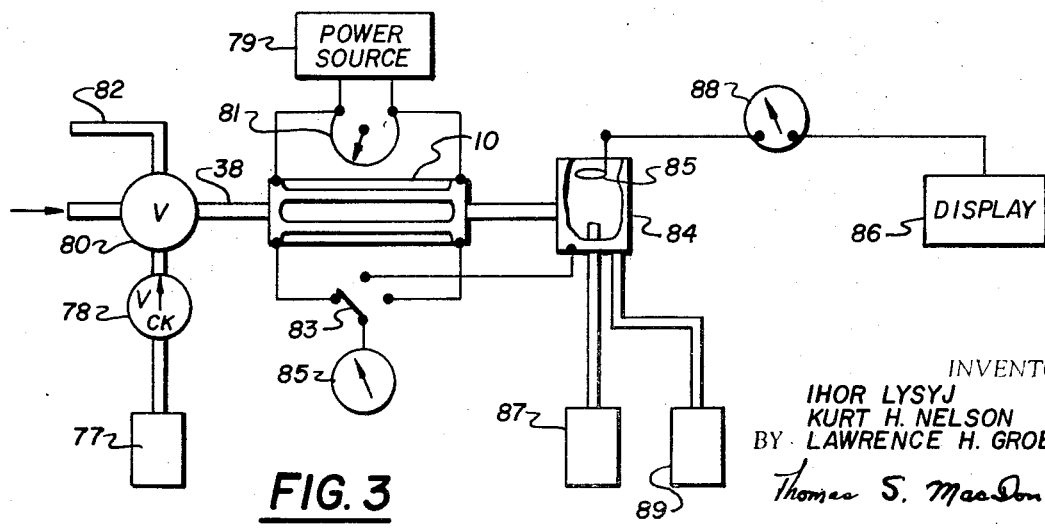
FIG. 3 is a flow diagram of the preferred overall system of this invention.

Referring now to FIG. 3; the preferred system of this invention comprises a two position micro-volume sampling valve 80, preferably of the type shown in U.S. Pat. 3,297,053, wherein the specimen of organics-containing sewage water flows through sample loops of the valve and any excess is passed to a drain 82. Connected downstream of sampling valve 80 is a check valve 78 and nitrogen steam or other inert gas supply source 77. Check valve 78 is provided to prevent reverse flow in the nitrogen supply source 77 line when a simple is injected into pyrolysis chamber 10. Located downstream of sample valve 80 is pyrolytic furnace 10 with a suitable sample injection line 38 connected therebetween. Connected to pyrolytic furnace 10 is a power source 79 controlled by a variable transformer or a rheostat 81 or other suitable means for controlling the power to element 26 and thus the inner zone temperature. Also connected to furnace 10 and hydrogen ionization flame detector 84 is a 3-position switch 83 which is connected in series with a temperature indicator 85. By activating switch 83 in any of the three positions, temperature readings for the pyrolysis chamber 40, flow stabilization column 32 and the hydrogen flame ionization detector 84 can be visually obtained on the temperature indicator 85. Downstream from pyrolytic furnace 10 is a hydrogen flame ionization detector 84 such as a Hewlett-Packard, Series 402 detector and hydrogen supply 87 and air supply 89. Connected in series between flame ionization detector 84 with its collector 85 and display means 86 is an electrometer 88, which amplifies the signal from detector 84 to be recorded on a display means 86 such as a strip chart recorder.

In operation a small sample of sewage water typically entering or being treated by a sewage treatment plant is injected by a syringe or other suitable means into sampling valve 80, wherein the specimen of water flows through a sample loop of the valve and excess flows to a drain 82. During this time the nitrogen carrier gas from the nitrogen supply flows through a check valve 78 and then through a second loop and into the pyrolysis chamber. Rotation of the sampling valve 40 switches flow of carrier gas into the sample or first loop where the measured volume of specimen is injected by the nitrogen pressure into the pyrolysis chamber furnace 10. Upon entry of the organic-containing wastewater into pyrolysis chamber 40 it is vaporized, fragmented and dispersed. The steam produced by vaporization also acts as a carrier gas along with the nitrogen gas. The flow then continues by reason of the nitrogen and steam pressure through the flow stabilization column or tube at a substantially reduced speed and reduced temperature. Upon exit from the flow stabilization tube the resultant organic fragments are carried to the hydrogen flame ionization detector 84 where the volatile organic compounds are measured. Following signal amplification from electrometer 88, an input of any needed correlation factors, a signal indicative of the organic content or biological oxygen demand of the waste water is then presented visually on the strip recorder 86 or otherwise employed in process control.

The furnace system may be employed in other applications, for example, wherein chamber 40 is a combustion chamber for oxidizing, with oxygen, organic constituents of water or other mediums. Carbon dioxide is formed in the combustion process which may then be flowed through the system to a suitable detector, such as an infrared apparatus.

The specific structure and process disclosed above and in the drawings is illustrative of the invention and could be varied to produce the same results without departing from the scope of the inventive concept which is defined in the appended claims.

We claim:

1. A pyrolytic furnace comprising a pyrolysis chamber having an entrance end and an exit end,
   means attached to said entrance end of said chamber to conduct an organic-containing sample therein,
   a heating element adjacent to said chamber to heat said chamber to a sample pyrolysis temperature and forming an inner high temperature zone,
   heat insulation means surrounding said chamber and said element and extending generally coextensive therewith for diminishing the heat flux from said inner zone,
   a flow stabilization tube attached to and in flow communication with said exit end of said chamber,
   said tube concentrically surrounding said insulation means in an outer lower temperature zone,
   means concentrically mounted around said tube to control heat emission from said outer heat zone, and
   means extending from said flow stabilization tube adapted to be in flow communication with a detector for detecting organic fragments in a pyrolyzed sample.

2. The invention as set forth in claim 1 further including a circular end plate mounting said pyrolysis chamber, said heat insulation means and said heat emission control means and wherein said means for conducting an organic containing sample into the pyrolysis chamber extends through said end plate.

3. The invention as set forth in claim 1 in which said heat insulation means includes a cylindrical ceramic cylinder surrounding said pyrolysis chamber and heating element and a spaced open-ended cylinder of reflecting metal surrounding said ceramic cylinder.

4. The invention as set forth in claim 3 further including an end-plate mounting said pyrolysis chamber and one end of said ceramic cylinder.

5. The invention as set forth in claim 1 wherein said flow stabilization tube is helically wound around the outer periphery of said heat insulation means in a direction reverse to the flow of the sample through the pyrolysis chamber.

6. The invention as set forth in claim 1 in which said means to control heat emission comprises a cylindrical housing member concentrically surrounding said flow stabilization tube and said heat insulation means and containing means forming a plurality of longitudinal apertures spaced around the periphery thereof
   and a rotatable cylindrical shutter member generally coextensive with said housing member and having means providing apertures of corresponding size, shape and number as those in said housing, said shutter member being rotatable to control heat emission from said outer temperature zone.

7. The invention as set forth in claim 1 wherein said means conducting an organic-containing sample to the chamber includes an in-line control valve,
   conduit means extending from said valve to the interior of said pyrolysis chamber,
   a source of carrier gas, and
   a check valve in the line between said carrier gas supply and said control valve,
   whereby said carrier gas will carry an organic-containing sample pyrolyzed in said pyrolysis chamber through said flow stabilization tube to the detector.

8. The invention as set forth in claim 7 including an end plate mounting the entrance end of said chamber and wherein said conduit means extends therethrough and further including a heat transfer block in abutting and bridging relationship to the exterior of said end plate and to a portion of said carrier gas check valve to allow heating of the check valve to prevent condensation therein.

References Cited

UNITED STATES PATENTS 3,230,046   1/1966   Beroza _____ 23—232 XR
3,232,851   2/1966   Haber et al. _____ 23—277 XR MORRIS O. WOLK, Primary Examiner R. M. REESE, Assistant Examiner U.S. Cl. X.R.

23—277, 288